United States Patent [19]
Luther

[11] Patent Number: 5,640,590
[45] Date of Patent: Jun. 17, 1997

[54] METHOD AND APPARATUS FOR SCRIPTING A TEXT-TO-SPEECH-BASED MULTIMEDIA PRESENTATION

[75] Inventor: Willis J. Luther, Irvine, Calif.

[73] Assignee: Canon Information Systems, Inc., Costa Mesa, Calif.

[21] Appl. No.: 978,336

[22] Filed: Nov. 18, 1992

[51] Int. Cl.⁶ .................................................. G01L 5/02
[52] U.S. Cl. .................................................. 395/806
[58] Field of Search .................... 395/152–154, 395/2.79–2.87, 144, 147, 2.69; 381/52

[56] References Cited

U.S. PATENT DOCUMENTS

| | | | |
|---|---|---|---|
| 4,931,950 | 6/1990 | Isle et al. | 395/11 |
| 4,933,880 | 6/1990 | Borgendale et al. | 395/147 |
| 5,109,482 | 4/1992 | Bohrman | 395/154 |
| 5,119,474 | 6/1992 | Beitel et al. | 395/154 |
| 5,208,745 | 5/1993 | Quentin et al. | 395/11 |
| 5,375,197 | 12/1994 | Kang | 395/147 |
| 5,388,993 | 2/1995 | McKiel et al. | 434/118 |
| 5,416,899 | 5/1995 | Poggio et al. | 395/152 |

FOREIGN PATENT DOCUMENTS

| | | |
|---|---|---|
| 484046 | 5/1992 | European Pat. Off. |
| 90/01195 | 2/1990 | WIPO |

OTHER PUBLICATIONS

Lerner, Eric J. "Products that talk", IEEE Spectrum Jul. 1982 pp. 32–37 381/52.
Shafer, Understanding HyperTalk, 1988, pp. 1–8, 29, 32, 38–39, 83–107,183–188, 241–243.
Whittaker, dBase III for the IBM PC, 1985, p. 105.

Primary Examiner—Heather R. Herndon
Assistant Examiner—Anton W. Fetting
Attorney, Agent, or Firm—Fitzpatrick, Cella, Harper & Scinto

[57] ABSTRACT

Method and apparatus for scripting a multimedia presentation in accordance with a multimedia script file. The multimedia script file includes text narration and multimedia scripting commands which are set off from the text narration by action tokens. A processor serially and sequentially processes the multimedia script file so as to detect the multimedia scripting commands when an action token is encountered. The text narration in the multimedia script file is fed to a text-to-speech conversion interface. The multimedia scripting commands are executed so as to cause file access such as retrieval and multimedia display of MIDI music files, still video and motion video images, animated images, and digital audio wave files, so as to alter the text-to-speech characteristics of the text-to-speech converter, and so as to cause multimedia script branching and/or control, preferably based on operator input and/or arithmetic calculations.

32 Claims, 8 Drawing Sheets

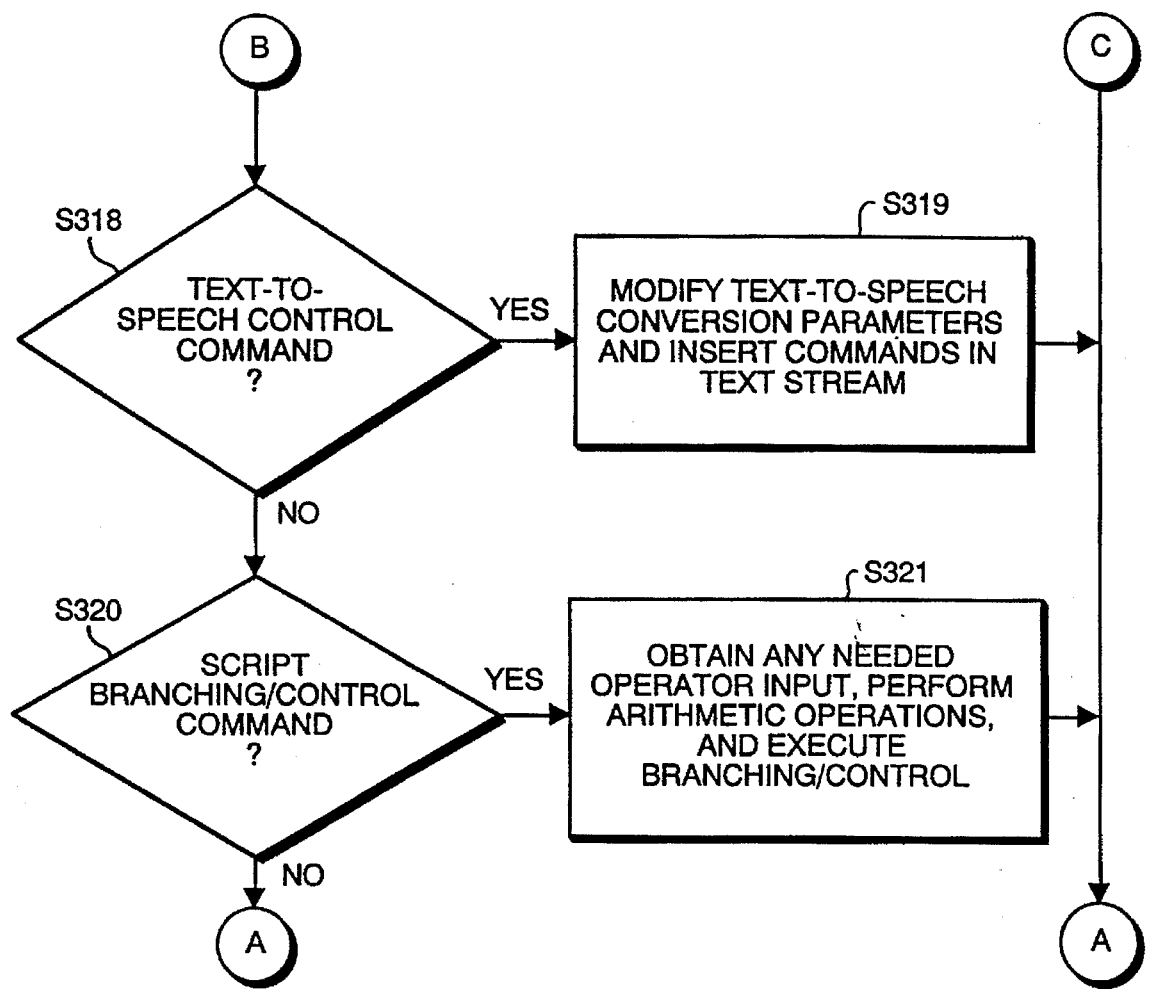
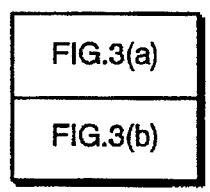
FIG.3(b)
FIG.3

45 |MALE: |
HELLO THERE I AM CLAUDE, A SYNTHETIC VOICE.
46 THIS IS A LITTLE DEMO OF THE MACRO SCOPE.
LETS START WITH SOME MIDDY MUSIC.
THIS IS THE MIDDY FUNCTION.
47 |MIDIIN:F: \MPC\CLAVIER|
NOTICE THAT THE MUSIC STILL PLAYS WHILE I AM TALKING.
49 ALSO NOTICE THAT THE ACRONYM MIDI IS SPELLED M I D D Y
    TO GET THE RIGHT PRONUNCIATION.
50 |IMAGEIN:DIBIT F: \MPC\MOON|
THIS IS THE IMAGE MAX FUNCTION.
51 |IMAGEMAX: |
IMAGE MAX MAKES THE PICTURE AS LARGE AS IT CAN WITHOUT
    OVERFLOWING THE SCREEN.
IT MAINTAINS THE ASPECT RATIO SO THE IMAGE DOES NOT GET
    DISTORTED.
THIS IS THE WAVE FUNCTION WHICH PLAYS WAVE FORM FILE.
52 |IMAGEOUT: |
53 |STARTVIDEO:DIBIT F: \MPC\LAUNCH1 |
54 |WAVEIN:  F: \MPC\WAVE2 |
NOTICE I COULD NOT TALK WHILE THAT WAS PLAYING.
MIDDY AND WAVE CAN PLAY TOGETHER, BUT NOT WAVE AND WAVE.
    MY TEXT-TO-SPEECH IS IMPLEMENTED AS A WAVE FUNCTION
    SO THAT I CANNOT SPEAK WHILE AN AUDIO WAVE FILE IS
    PLAYING. IMPLEMENTATIONS CAN DIFFER TO AVOID THIS.
|FEMALE: |
THIS IS CLAUDIA A DIFFERENT SYNTHETIC VOICE.
THIS IS THE FACE OUT FUNCTION.
|FACEOUT: |
THIS IS THE FACE IN FUNCTION.
|FACEIN: |
|IMAGEOUT: |
GOODBYE NOW!

FIG. 4

METHOD AND APPARATUS FOR SCRIPTING A TEXT-TO-SPEECH-BASED MULTIMEDIA PRESENTATION

BACKGROUND OF THE INVENTION

1. Field Of The Invention

The present invention relates to a system for scripting a text-to-speech-based multimedia presentation, and in particular, to a system in which a scripting file which includes text narration and multimedia commands is processed so as to separate the text from the commands, to enunciate the text narration, and to execute the multimedia commands.

2. Description Of The Related Art

Recently, the sophistication of computerized multimedia presentations has increased dramatically. Such presentations include audio programs, such as MIDI ("musical instrument digital interface") music and digitized speech, and video programs which may include bit map still video images and digitized motion video or animated features. The audio program and the video program are scheduled into a combined multimedia presentation.

Conventional scheduling systems for the audio program and the video program in multimedia presentations are time/event-based scheduling systems in which each program (or event is scheduled to begin and end at pre-designated times. Thus, for example, FIG. 7 shows a system for scheduling a multimedia presentation which includes MIDI music, digitized audio speech, still video, and digital motion video programs. Each aspect of the program is scheduled to begin and end at specifically noted times as set forth on the time line for each program. Thus, for example, the multimedia presentation begins with a still video presentation of a "credits" file, and a MIDI music presentation synthesized from an "intro" file. At thirty seconds into the multimedia presentation, digitized speech is scheduled to begin a voice-over sequence that plays out at the same time as the synthesized MIDI music. Meanwhile, the still video "credits" file is closed out and a digitized motion video sequence from an "introduction" file commences. Scheduling of the multimedia presentation continues in accordance with the illustrated time line.

The foregoing scheduling technique is not entirely satisfactory. To edit the schedule, for example, it is necessary to change all program parts to ensure that the remaining parts are properly coordinated with each other. Thus, extending the length of a digitized speech sequence, such as the "voice-over" file, requires changes in the MIDI time line and in the digital motion video time line to ensure that those programs remain properly coordinated with each other.

Moreover, each of the various programs (MIDI, digitized speech, still and motion video) requires large amounts of memory for storage. And, particularly in the case of digitized speech, it is necessary to re-record the entire speech sequence where an edit is required.

SUMMARY OF THE INVENTION

It is an object of the invention to address the foregoing difficulties.

In one aspect, the invention is a method and apparatus for scripting a multimedia presentation in which a memory stores a multimedia script which includes text narration and multimedia commands. A processor serially and sequentially processes the multimedia script to separate the text narration from the multimedia commands. The text narration is channeled to a text-to-speech converter for enunciation as part of the multimedia presentation. The multimedia commands, which may be designated by an action token character such as a vertical bar ("|"), are executed to form part of the multimedia presentation. The multimedia commands include commands to incorporate various multimedia files, such as MIDI files, bit map image files, digital motion video files, animated bit map files, and digital audio wave files into the multimedia presentation, as well as commands to control text-to-speech conversion parameters and commands to branch and control the flow sequence of the multimedia script file.

By virtue of this arrangement, when the multimedia script file is edited, it is not necessary to adjust other multimedia events because the serial and sequential processing of the multimedia script file will ensure proper coordination for the unedited multimedia events. Moreover, by including narrative text as part of the multimedia script file, it is possible to reduce storage requirements by about 1000:1 over digitized speech and also to avoid re-recording digitized speech files in the event that the narrative text is changed.

This brief summary has been provided so that the nature of the invention may be understood quickly. A more complete understanding of the invention can be obtained by reference to the following detailed description of the preferred embodiment thereof in connection with the drawings which together form a complete part of the specification.

BRIEF DESCRIPTION OF THE DRAWINGS

FIG. 4 is an example of a multimedia script file.

DETAILED DESCRIPTION OF THE PREFERRED EMBODIMENT

Figure 1:
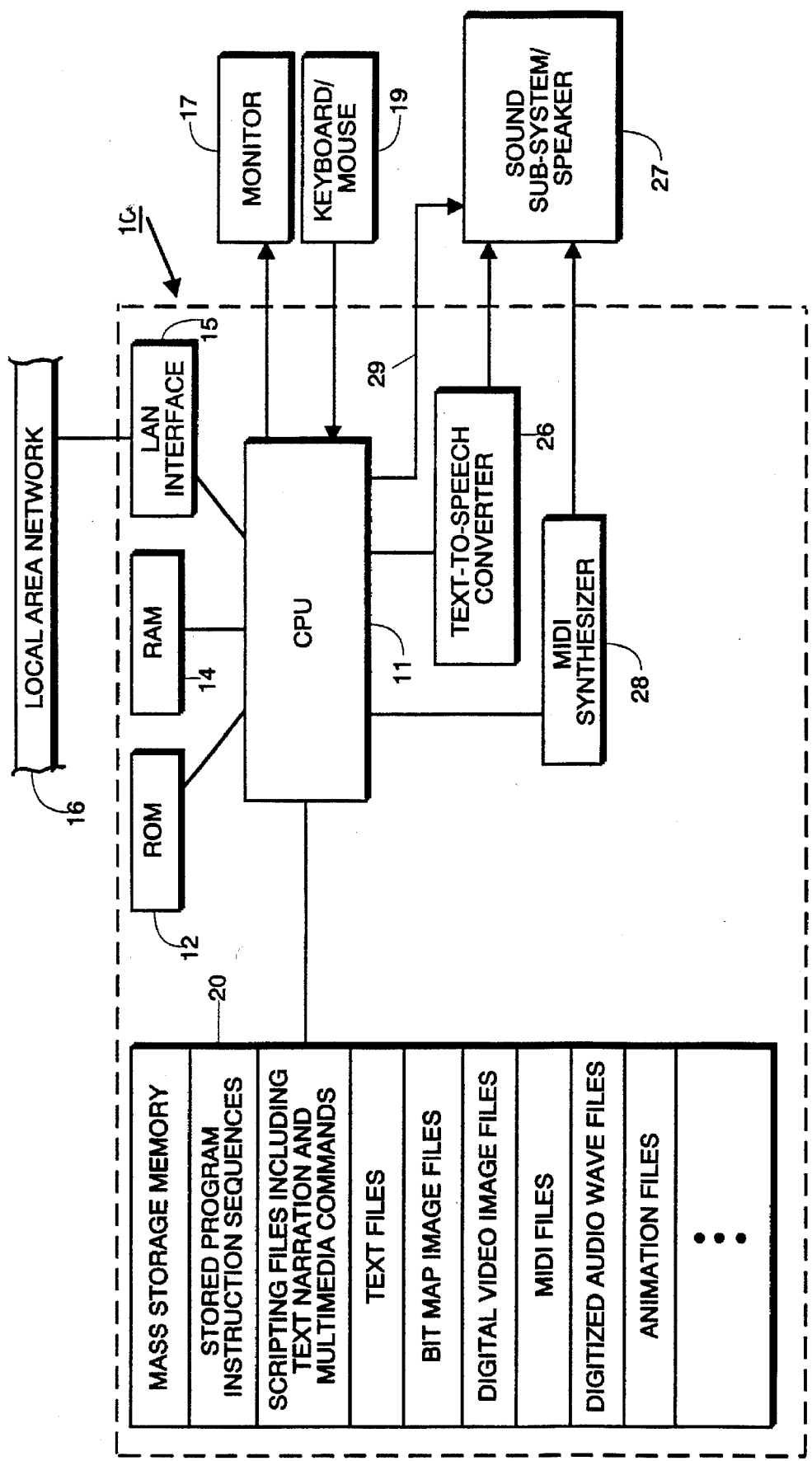
FIG. 1 is a block diagram showing an apparatus according to the invention.

FIG. 1 is a schematic block diagram of an apparatus according to the invention.

In FIG. 1, reference numeral 10 designates personal computing equipment such an IBM PC or PC-compatible computer. Computing equipment 10 includes a CPU 11 such as an 80386 processor which executes stored program instructions, such as operator-selected application programs that are stored in RAM 14 or specialized functions such as start up programs which are stored in ROM 12. Computing equipment 10 further includes a local area network interface 15 which provides access to a local area network 16 whereby the computing equipment can access files on a remote file server or send files for remote printing or otherwise interact with a local area network in accordance with known techniques such as by file exchange.

Computing equipment 10 further includes a monitor 17 for displaying graphic images such as the video portion of a multimedia presentation and a keyboard/mouse 19 for allowing operator designation of desired functions and for inputting operator commands.

Mass storage memory 20, such as a fixed disk or a floppy disk drive is connected for access by CPU 11. Mass storage memory 20 typically includes stored program instruction sequences such as an instruction sequence for multimedia script file processing according to the invention, or other application programs such as word processing application programs, optical character recognition programs, spreadsheet application programs, and other information and data processing programs. Mass storage memory 20 further includes multimedia scripting files having text narration and multimedia commands therein, text files, bit map image files, digital video image files, animated bit map images ("FLI" files), MIDI files, and digitized audio wave files. Other data may be stored in mass storage 20 as designated by the operator.

Although not shown in FIG. 1, computing equipment 10 may be provided with a modem, a facsimile interface, and a voice telephone interface so that CPU 11 can interface to an ordinary voice telephone line. Such interfaces provide further means by which CPU 11 can obtain data files for processing in accordance with the invention.

A conventional text-to-speech converter 26 is connected to CPU 11. The text-to-speech converter 26 interprets text strings sent to it and converts those text strings to audio speech information. The text-to-speech converter 26 provides the audio speech information to a sound sub-system speaker 27 which includes a speaker. It is also possible for the text-to-speech converter 26 to provide the audio speech information to other audio interfaces, such as to a voice telephone interface. The text-to-speech converter 26 includes controllable text-to-speech conversion parameters which control the characteristics of the speech enunciated by the converter. For example, it is possible to control parameters which vary the speed, pitch, volume and voice of the text-to-speech converter.

MIDI synthesizer 28 is also connected to CPU 11 and interprets MIDI music to convert it to audio waveforms which, in turn, are played out over speaker 27.

CPU 11 also includes an audio port 29 for direct output of digital wave files to speaker 27 for playout by speaker 27.

Figure 2:
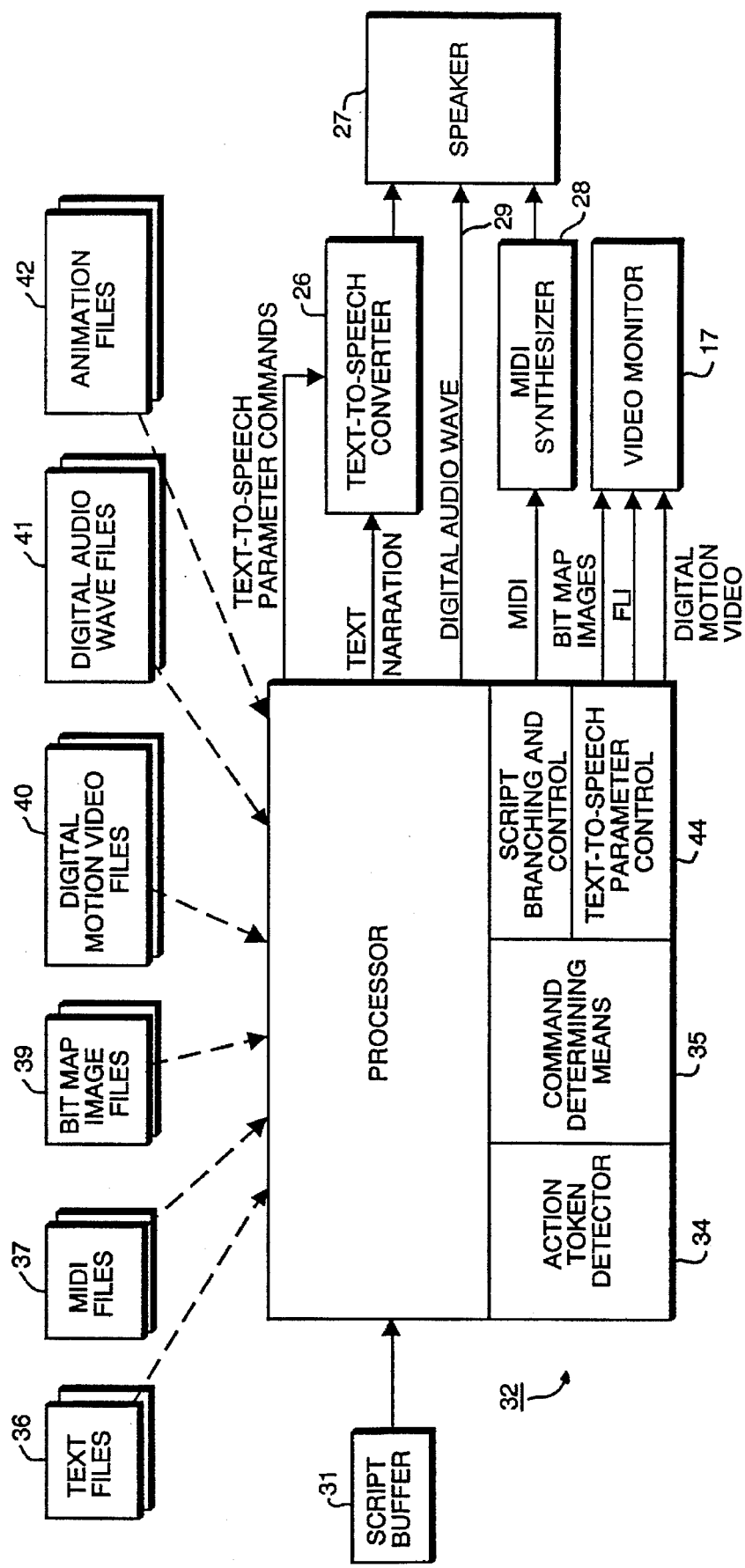
FIG. 2 is a functional block diagram for explaining how multimedia script files are processed.

FIG. 2 is a functional block diagram for explaining operation of the FIG. 1 apparatus. In FIG. 2, 31 is a multimedia script buffer for storing a multimedia script file which contains text narration and multimedia commands. The multimedia script in script buffer 31 is provided to processor 32 which separates the text narration from the multimedia commands and provides the text narration to the text-to-speech converter 26. The presence of multimedia commands is detected by an action token detector 34 which identifies the beginning of each scripting command. The action token detector in the present embodiment is a vertical bar ("|"), but any action token may be utilized. When processor 32 encounters an action token as detected by action token detector 34, it processes the succeeding information in script buffer 31 as a multimedia scripting command and determines by reference to command determining means 35 what multimedia command is intended. In general, the multimedia scripting command can include commands to incorporate further text files 36 and feed the text from those text files to text-to-speech converter 26, commands to obtain MIDI files 37 and feed the MIDI music in those files to MIDI synthesizer 28, commands to obtain bit map image files 39 and to feed the still video information in those bit map image files to video monitor 17, commands to obtain digital motion video files 40 and to feed the digital motion video information in those files to video monitor 17, commands to obtain animation files 42 ("FLI" files) and to feed animated sequences in those files to video monitor 17, and commands to retrieve digital audio wave files such as digitized speech or other sounds from digital audio wave files 41 and to feed those digital audio waves over interface 29 to speaker 27.

The multimedia scripting commands may also include commands to branch and control within the multimedia script file, as indicated illustratively at 44. The branching and control within the script file may be operator-controlled, for example, through operator interaction in response to queries generated by the scripting commands in the script buffer. Branching and control may also be performed in accordance with arithmetic operations. Scripting branching and control is advantageous in situations where multimedia presentations are used in connection with computer aided instruction programs.

The multimedia scripting commands may also include commands to alter the parameters which control the text-to-speech conversion characteristics of text-to-speech converter 26, as illustrated at 44. Based on the scripting commands in the script buffer, the text-to-speech parameters are fed to text-to-speech converter 26. Although illustrated in FIG. 2 as a distinct channel to text-to-speech converter 26, it is preferable for the text-to-speech command parameters to be embedded in the text narration fed to text-to-speech converter 26, so as to avoid the possibility of desynchronization between the speech commands and the text with which those commands are associated.

Figure 3A:
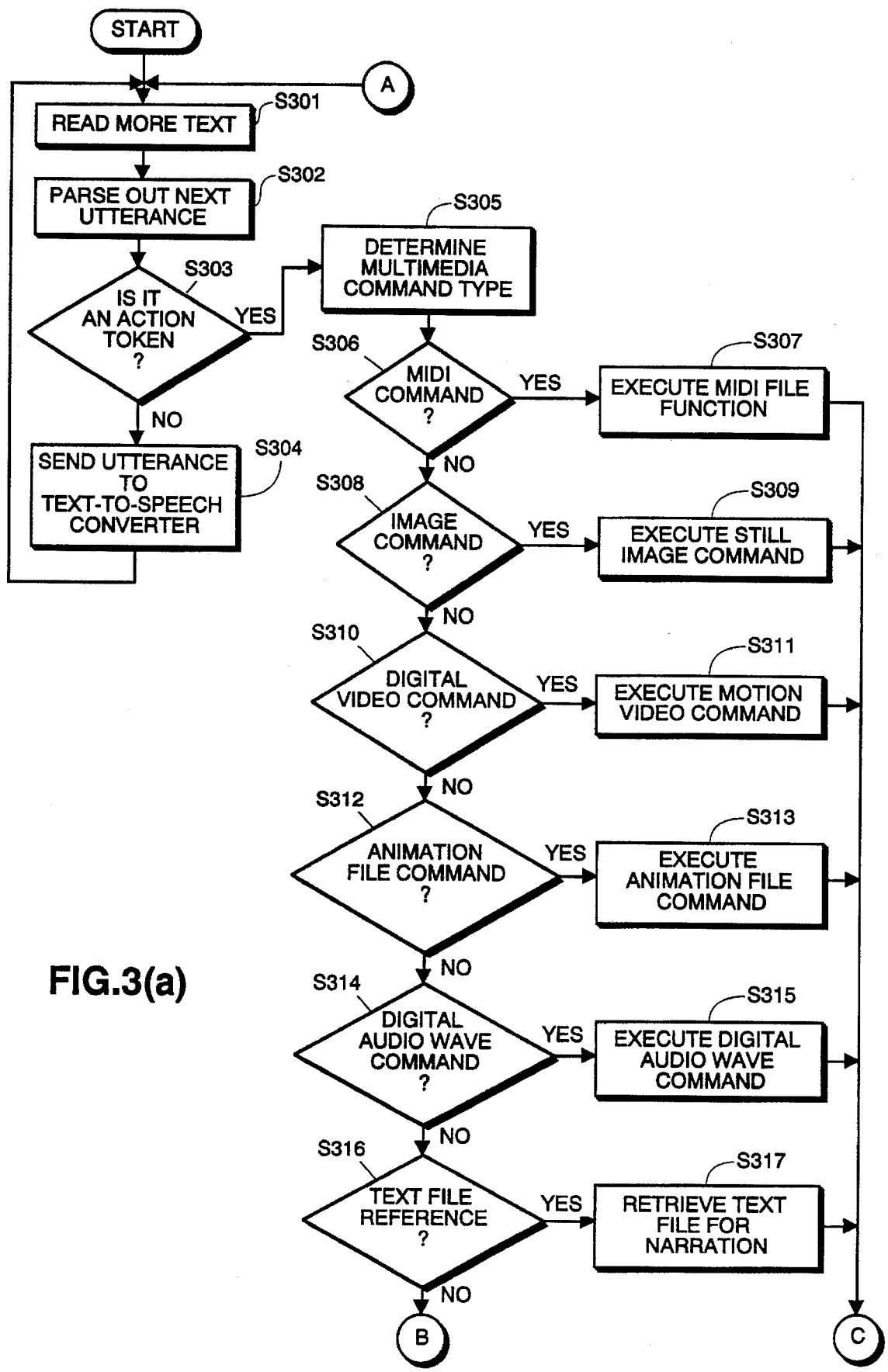
FIG. 3 comprised of FIGS. 3,(a) and (b), is a flow diagram for explaining processing of multimedia script files according to the invention.

FIG. 3 is a detailed flow diagram showing operation of the present invention. The process steps illustrated in FIG. 3 are executed by CPU 11 in accordance with stored program instruction steps in mass storage memory 20 which, most conveniently, are loaded into RAM 14 prior to execution.

In step S301 CPU 11 serially and sequentially reads more text from the multimedia scripting file stored in script buffer 31. The next utterance in the scripting file is parsed (step S302). Parsing may be performed in accordance with U.S. patent application Ser. No. 07/978,487, now U.S. Pat. No. 5,555,343. entitled "Text Parser For Text-To-Speech Converter", the contents of which are incorporated herein by reference as if set forth in full below. In step S303 CPU 11 determines whether the next utterance is an action token which signifies a multimedia scripting command. In this embodiment, a vertical bar ("|") is used as an action token. The same symbol is also used as a termination character for the multimedia scripting command, such that all characters between a pair of vertical bars are interpreted as a multimedia scripting command.

If the next utterance is not an action token, then flow advances to step S304 in which the utterance is sent to text-to-speech converter 26. Flow thereupon returns to step S301 where more text is read from script buffer 31.

On the other hand, if in step S303 CPU 11 determines that an action token has been encountered, then flow advances to step S305 where CPU 11 determines the type of multimedia scripting command that has been encountered. According to this embodiment of the invention, at least three types of multimedia scripting commands are supported: a file access command, a text-to-speech control command, and a script/branching control command. A complete set of multimedia script commands supported by the present embodiment of the invention is shown in the appendix to this application. File access commands cause CPU 11 to access particular types of files and to display those files (either audibly or visually) in a multimedia environment according to the command. Thus, file access commands permit MIDI files, bit map image files, digital video image files, animated bit map "FLI" files, digital audio wave files, and text files to be retrieved and displayed in a multimedia environment. File access commands are processed in steps S306 through S317 in which the appropriate one of the files (for example, MIDI files, animated files, bit map image files, digital video image files, digital audio wave files, or text files) are retrieved and the associated file access command is executed. Flow thereupon returns to step S301 where CPU 11 serially and sequentially reads more information from the multimedia script file in script buffer 31.

Text-to-speech control commands modify the text-to-speech conversion parameters and insert those modified conversion parameters into a text stream where they are interpreted by text-to-speech converter 26. If CPU 11 determines that a text-to-speech control command has been encountered (step S318), then flow advances to step S319 in which CPU 11 modifies the text-to-speech conversion parameters and inserts the modified parameters into the text stream. The conversion parameters are interpreted by the text-to-speech converter 26 to modify the speech conversion characteristics of the converter. For example, it is possible to alter volume, speed, pitch and voice of text-to-speech converter 26. Thereupon, flow returns to step S301 in which CPU 11 continues to serially and sequentially process the multimedia script file in script buffer 31.

Script branching and control commands allow modification of the serial and sequential progress of CPU 11 through the multimedia script file in script buffer 31. Branching and control allows multimedia scripting to advance to non-sequential locations. If CPU 11 determines that a script branching/control command has been encountered (step S320), then flow advances to step S321 in which CPU 11 obtains any needed operator input, for example, from keyboard/mouse 19, and executes the branching or control command in accordance with the operator input. Additional branching is supported as are multiple gotos, as set forth in the appendix to this application. Flow thereupon returns to step S301 in which CPU 11 continues to serially and sequentially process the multimedia script file in script buffer 31 but commencing at the non-sequential location set by step S321.

FIG. 4 is an example of a multimedia scripting file such as a multimedia scripting file that may be stored in mass storage memory 20. In accordance with the flow diagram of FIG. 3, CPU 11 first encounters a pair of action tokens with a multimedia command 45 therebetween, which in this case is a text-to-speech control command which causes CPU 11 to select a male voice for text-to-speech converter 26. Thereupon, in accordance with the serial and sequential processing of the multimedia script file, CPU 11 feeds the text narration at 46 to text-to-speech converter 26 for enunciation. Then, at 47, CPU 11 encounters another pair of action tokens which designate a multimedia scripting command 47. In this case, the multimedia scripting command 47 is a file access command which specifies that the MIDI file "F:\MPC\CLAVIER" is to be sent to MIDI synthesizer 28 for synthesizing digital music which is played out over speaker 27. As the MIDI music begins playing, CPU 11 serially and sequentially processes the multimedia script file and thus sends the text narration at 49 to text-to-speech converter 26 for simultaneous playout over speaker 27 with the synthesized MIDI music.

Figure 5:
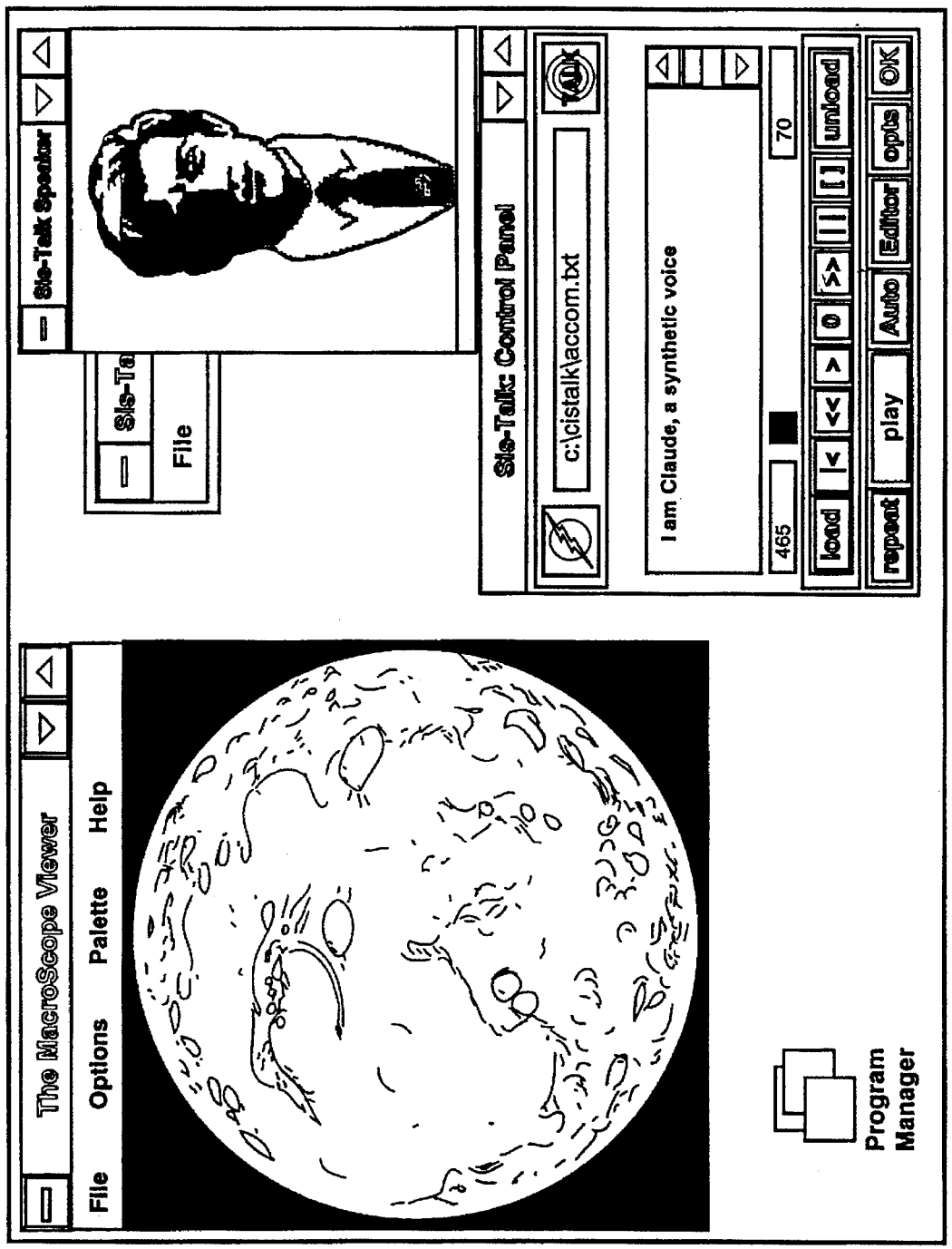
FIGS. 5 and 6 are examples showing the video portion of multimedia presentations in accordance with the multimedia script of FIG. 4.

At 50, CPU 11 encounters another action token, which in this case signifies a file access command, specifically, to retrieve and to display the bit map image file "F:\MPC\MOON". Upon execution of the command at 50, the video display in FIG. 5 is obtained from which it can be seen that the bit map image of a moon has been superimposed for multimedia display on video monitor 17. Meanwhile, CPU 11 continues serially and sequentially processing the multimedia scripting file sending the text at 51 to the text-to-speech converter 26.

Figure 6:
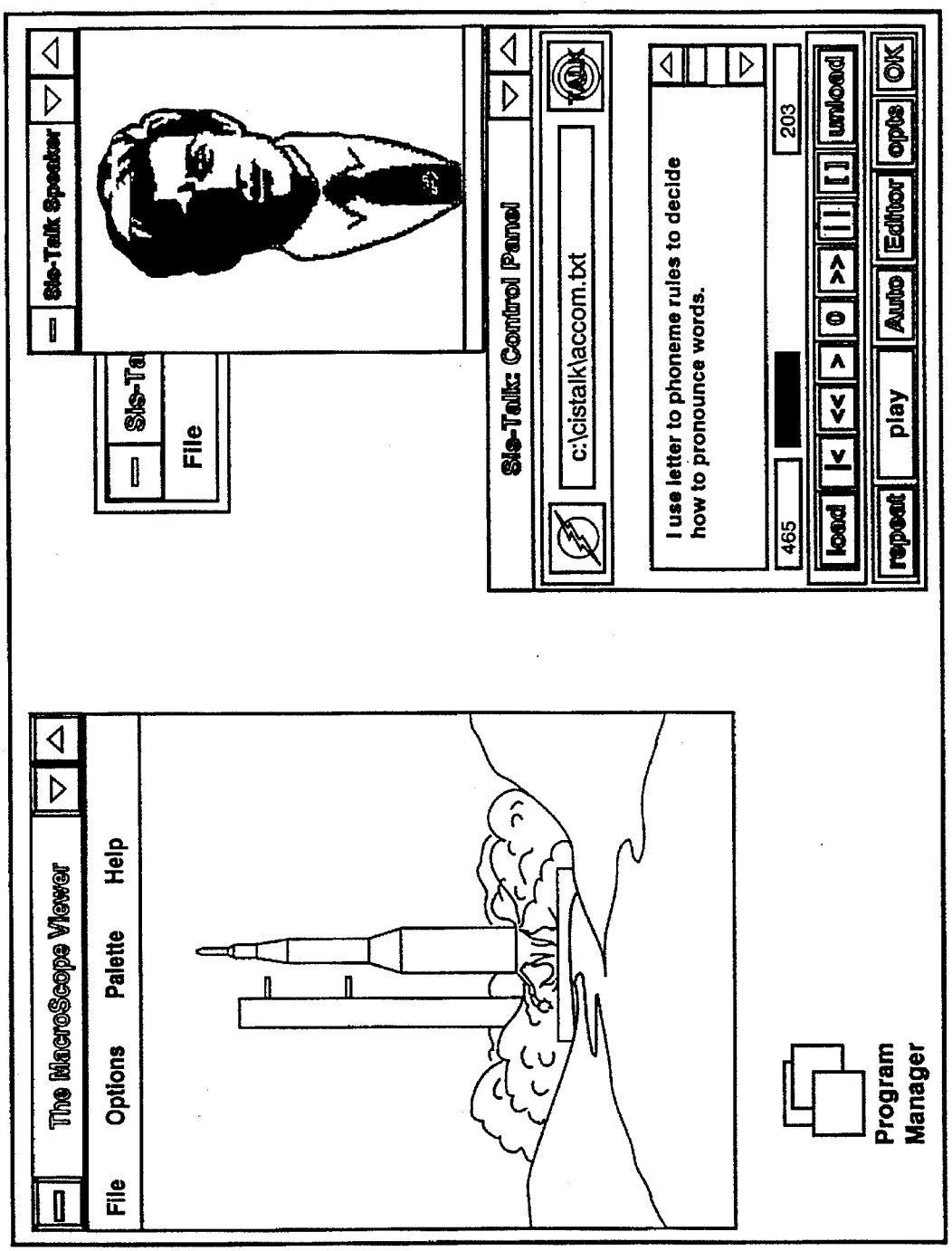
Figure 7:
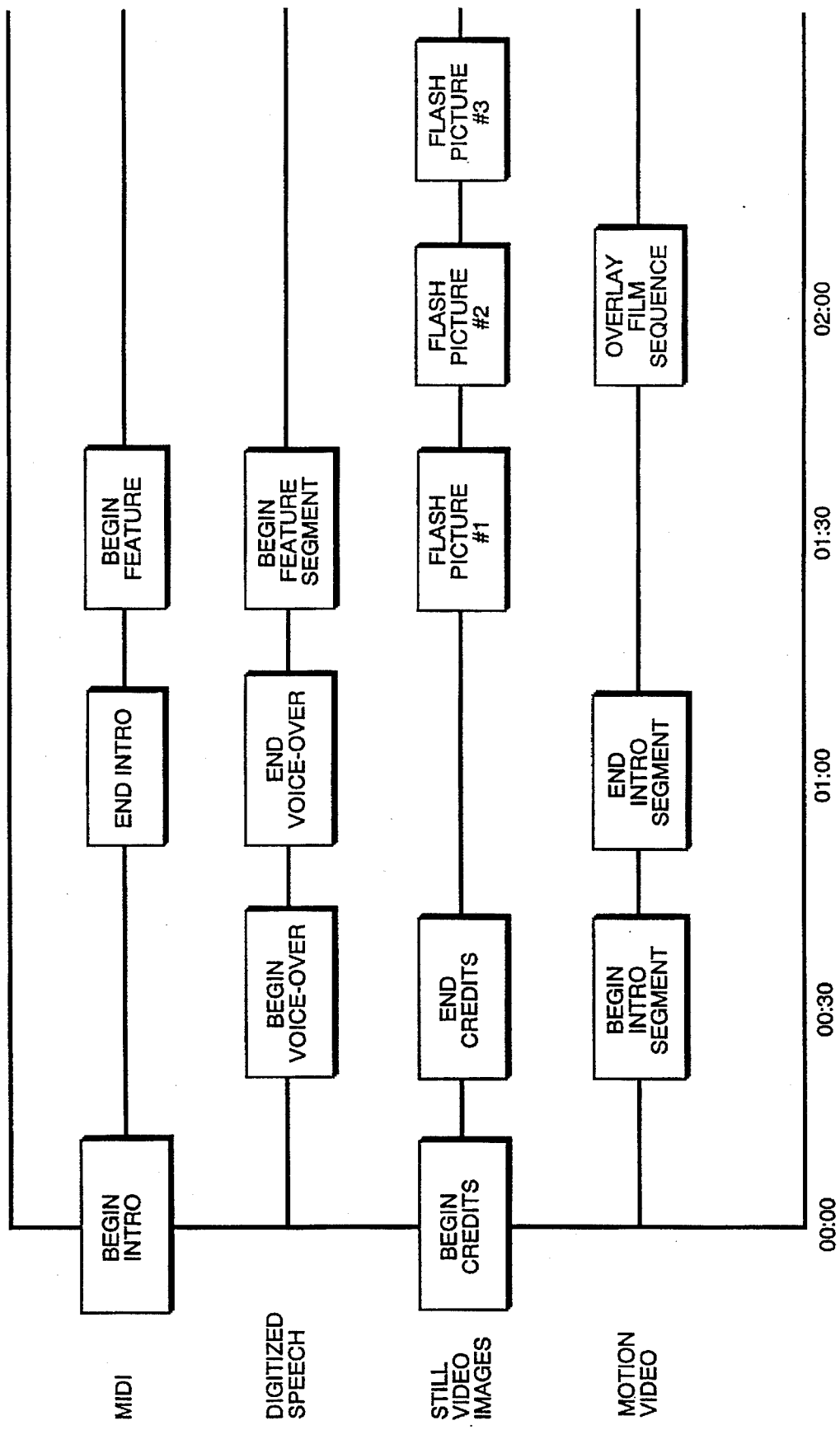
FIG. 7 is a time line showing a time/event multimedia scheduling system according to the prior art.

Flow advances through the multimedia scripting file of FIG. 4 until an "imageOut" command is encountered at 52, at which point the image of the moon from file "F:\MPC\MOON" is deleted from the video monitor. Upon encountering the multimedia scripting command at 53, CPU 11 determines that a file access command has been designated and starts digital motion video file "F:\MPC\LAUNCH 1". Immediately following the commencement of digital motion video display on video monitor 17, CPU 11, in accordance with its serial and sequential processing of the multimedia scripting file, encounters the file access command designated at 54 which causes a digital audio wave file (here, launch sounds associated with the video sequence) to be played out over speaker 27 as part of the multimedia presentation. The video portion of the program at this stage of multimedia scripting is illustrated at FIG. 6.

CPU 11 continues its serial and sequential processing of the multimedia scripting file shown in FIG. 4 in a manner that will be evident by reference to the scripting commands shown in the Appendix to this application.

As will be apparent from the foregoing description, the multimedia scripting file may be edited by conventional word processing programs executed in CPU 11 without the need to resort to special means for maintaining coordination between the various aspects of the multimedia presentation. Thus, for example, it is possible to change any of the text narration without the need to modify time lines respecting other aspects of the multimedia program, such as the video or audio programs. Likewise, it is also possible to insert and to delete video and audio programs in the multimedia scripting file and to play out a multimedia presentation in accordance with the modified scripting file without the need for complicated modifications to the multimedia script file. For this latter purpose, it is advantageous to permit CPU 11 to begin processing of the multimedia scripting file from any arbitrary point within the scripting file. Control techniques such as those described in U.S. patent application Ser. No. 07/977,680, now U.S. Pat. No. 5,500,919, entitled "Graphic User Interface For Controlling Text-To-Speech Conversion" may be used for this purpose. The contents of that application are incorporated herein by reference as if set forth here in full. If the multimedia scripting file is started from arbitrary positions, then it is preferable for CPU 11 to pre-scan the multimedia scripting files for all multimedia commands within the scripting file, and to ensure that the multimedia play out devices (here, video monitor 17, text-to-speech converter 26, and MIDI synthesizer 28) are properly configured in accordance with the last-issued command for those devices.

APPENDIX: SCRIPTING COMMANDS FOR
TEXT-TO-SPEECH BASED ON MULTIMEDIA
PRESENTATIONS

Each scripting command is identified by an
initial action token ("|") and with a terminating
character, here the same symbol as the action token
("|"). All commands have the same general form, as

APPENDIX: SCRIPTING COMMANDS FOR TEXT-TO-SPEECH BASED ON MULTIMEDIA PRESENTATIONS follows:
"| command_verb:  {parameter #1},
                 {parameter #2}, ... |"

A. Text-to-speech Commands
   |talkVolume:   {number 1–15}|
       Set text-to-speech volume.
   |talkSpeed:    {number 1–15}|
       Set text-to-speech speed.
   |talkPitch:    {number 1–3}|
       Set text-to-speech pitch.
   |talkMan:      {actor's name}|
       Use male voice and face for actor named.
   |talkGirl:     {actress's name}|
       Use female voice and face for actress named.
   |faceIn:       {fx}|
       Show animated face, with special effect fx (if given).
   |faceOut:|
       Remove animated face.
   |faceMax:|
       Maximize size of face.
   |faceMin:|
       Minimize size of face.

B. MIDI Music File Commands
   |midiIn:       {pathname}|
       Load MIDI music file from "pathname".
   |midiPlay:     {wait/overlapped} {on complete goto} tag|
       Start playing current MIDI music file.
   |midiPause:    {pause time}|
       Pause current MIDI music file play, keeping track of position.
   |midiStop:     |
       Stop and the current MIDI music file. Resets position to zero.
   |midiOut:      |
       Close/unload current MIDI music file.
   |midiList:     {pathname a}, {pathname b}, ... |
       This is a list of MIDI tunes to play, overlapped, next on end, auto-recycle.
   |midiVolume:   number|
       Set MIDI volume.
   |midiSpeed:    number|
       Set MIDI speed.

C. Image Commands
   |imageIn:      {pathname}, {ULC}, {LRC}|
       Pops "pathname" image into rectangle defined by upper left corner ULC and lower right corner LRC.
   |imageOut:     {pathname}|
       Removes the image.
   |sequenceImages:  {ULC}, {LRC}, {pathname_1}, {time_1}, {pathname_2}, {time_2}, ... |
       Sequentially displays images in pathnames 1, 2, etc. for their respective times in rectangle ULC, LRC.

D. Video Commands
   |startVideo:   {pathname}, {ULC}, {LRC}|
       Starts motion video "pathname" for playout in rectangle ULC, LRC.
   |freezeVideo:  {pathname}|
       Freezes window used by "pathname" video motion sequence.
   |videoOut:     {pathname}|
       Frees window used by "pathname" video motion sequence.

E. Text File Commands
   |importText:   {pathname}|
       Imports a text file, which may include scripting commands, from "pathname" file.

F. Animation File Commands
   |fliIn:        {pathname}, {ULC}|
       Load pathnamed FLI file and start playing it.
   |fliOut:       |
       Stop and unload current FLI animation.

G. Digitized Audio Wave File Commands
   |waveIn:       {pathname}|
       Begins play out of "pathname" digital audio wave file.
   |wavePause:    {pathname}|
   |waveOut:      |
       Closes current digitized audio wave file.

H. Flow Controls And Captioning
   |pause:        {n}|
       Pause for n milliseconds.
   |askUserYN:    {question text}, {if yes goto} tag name, {if no goto} tag name|
       Present question to user in a message box with yes and no buttons.
   |goTo:         {tag name}|
       Transfer control to tag. Forward or backward direction.
   |tag:          {tag name}|
       Destination for goto.
   |setHotSpot:   {spotReference}, {image reference name}, {ULC}, {LRC}, {goto} tag|
       Establish a hot spot in the referenced image at the rectangle enclosed by upper left corner ULC and lower right corner LRC. When mouse enters this area, invert the colors, reverting when mouse leaves. If user clicks mouse in that area, goto tag.
   |clearSpot:    {spotReference}|
       Remove referenced spot.
   |textIn:       {ULC}, {LRC}, {color}, {literal text}, {reference name}|
       Show literal text in colored box as dimensioned by ULC, LRC. Give it a reference name.
   |textOut:      {reference name}|
       Remove referenced text display.
   |showCursor:   {image reference name}, {x}, {y}, {blinking/stationary}|
       Show big arrow cursor at point x,y in referenced image.
   |hideCursor:   |
       Hide cursor, wherever it was.
   |askUserTF:    {similar to above}|
   |askUserMC:    {multiple choice texts:} a, b, c, ... {followed by number of correct choice} {if correct goto} tag, {if incorrect goto} tag|
       Multiple choice user-controlled branch; similar to "askUserYN".
   |askUserWord:  question text, correct answer word, {if correct goto} tag, {if incorrect goto} tag|
       Companion of user-entered text to correct text; useful for computer aided instruction.
   |clearRegister:    {alpha character}, {26 registers}|
   |bumpRegister:     {register}|
   |addToRegister:    {register}, {value/register}|
   |ifRegister:   {register}, {operator}, {value/register}, {goto} tag|
   |speakRegister:    {string}, {register}, {string}|
       Causes the value of the register, prefixed or suffixed by arbitrary text strings, to be enunciated by the text-to-speech converter.

What is claimed is:

1. Apparatus for scripting a multimedia presentation, said apparatus comprising:

a memory containing a multimedia script file, the multimedia script file including text narration and multimedia commands; and a processor for serially and sequentially parsing the multimedia script file such that in a case where a multimedia command is encountered in the multimedia script file, the multimedia command is executed, and such that in a case where text narration is encountered in the multimedia script file, the text narration is fed to a text-to-speech conversion interface without waiting for execution of a previously-encountered multimedia command to reach completion.

2. Apparatus according to claim 1, wherein said processor detects when an action token has been encountered in said multimedia script file.

3. Apparatus according to claim 2, wherein said processor identifies a multimedia command between a pair of action tokens.

4. Apparatus according to claim 1, further comprising means for determining a multimedia command type.

5. Apparatus according to claim 4, wherein said means for determining differentiates between file access commands, text-to-speech control commands, and script branching/control commands.

6. Apparatus according to claim 1, wherein said memory stores image files, and wherein said multimedia commands include commands to provide image files to a video interface.

7. Apparatus according to claim 6, wherein the image files are motion image files.

8. Apparatus according to claim 1, wherein said memory stores MIDI files and said multimedia commands include commands to provide the MIDI files to a MIDI synthesizer.

9. Apparatus according to claim 1, wherein said memory stores digitized audio wave files, and wherein said multimedia commands include commands to provide the digital audio wave files to an audio interface.

10. Apparatus according to claim 1, wherein the multimedia commands include commands to vary text-to-speech conversion parameters.

11. Apparatus according to claim 10, wherein the text-to-speech conversion parameters include parameters varying voice, frequency, speed and volume of converted speech.

12. Apparatus according to claim 1, wherein said multimedia commands include commands for branching and controlling said processor to access a non-sequential position in the multimedia script file.

13. Apparatus according to claim 12, further comprising means for accepting operator commands, wherein the commands for branching and controlling are conditional commands based on operator input.

14. Apparatus according to claim 1, further comprising edit means for altering the multimedia script file in said memory.

15. Apparatus according to claim 1, wherein said processor serially and sequentially processes the multimedia script file from a position other than the beginning thereof, and wherein said processor pre-scans the script file for multimedia commands up to that position.

16. Apparatus according to claim 1, wherein after text narration is fed to the text-to-speech conversion interface, the processor does not feed any more text narration to the text-to-speech conversion interface and does not execute any newly-encountered multimedia commands until conversion into speech reaches completion.

17. Apparatus for generating multimedia presentations, said apparatus comprising:

a multimedia presentation interface including an audio interface, a video interface, and a text-to-speech interface;

a memory for storing a multimedia script file, the multimedia script file including text narration and multimedia commands designated by action tokens, said memory further including digitized audio wave files, video files, and computerized music files; and a processor for serially and sequentially parsing the multimedia script file such that in a case where an action token is encountered in the multimedia script file, a multimedia command associated with the action token is executed, and such that in a case where text narration is encountered in the multimedia script file, the text narration is fed to the text-to-speech interface without waiting for execution of a previously-encountered multimedia command to reach completion, wherein said processor feeds digitized audio wave files, video files, and computerized music files, to respective ones of the audio and video interfaces and in accordance with the multimedia commands.

18. Apparatus according to claim 17, further comprising input means for inputting operator commands, wherein said multimedia scripting commands include branching and control commands, said processor executing the branching and control commands in accordance with operator input from said input means.

19. Apparatus according to claim 17, wherein said processor identifies a multimedia command between a pair of action tokens.

20. Apparatus according to claim 17, further comprising means for determining a multimedia command type.

21. Apparatus according to claim 20, wherein said means for determining identifies between file access commands, text-to-speech control commands, and script branching/control commands.

22. Apparatus according to claim 17, wherein said memory stores image files, and wherein said multimedia commands include commands to provide image files to a video interface.

23. Apparatus according to claim 22, wherein the image files are motion image files.

24. Apparatus according to claim 17, wherein the computerized music files comprise MIDI files, and wherein said multimedia commands include commands to provide the MIDI files to a MIDI synthesizer.

25. Apparatus according to claim 17, wherein said multimedia commands include commands to provide the digital audio wave files to an audio interface.

26. Apparatus according to claim 17, wherein the multimedia scripting commands include commands to vary text-to-speech conversion parameters.

27. Apparatus according to claim 26, wherein the text-to-speech conversion parameters include parameters varying voice, frequency, speed and volume of converted speech.

28. Apparatus according to claim 17, wherein said multimedia commands include commands for branching and controlling said processor to access a non-sequential position in the multimedia script file.

29. Apparatus according to claim 28, further comprising means for accepting operator commands, wherein the branching and controlling commands are conditional commands based on operator input.

30. Apparatus according to claim 17, further comprising edit means for altering the multimedia script file in said memory.

31. Apparatus according to claim 17, wherein said processor serially and sequentially processes the multimedia script file from a position other than the beginning thereof, and wherein said processor pre-scans the script file for multimedia commands up to that position.

32. Apparatus according to claim 17, wherein after text narration is fed to the text-to-speech interface, the processor does not feed any more text narration to the text-to-speech interface and does not execute any multimedia commands associated with newly-encountered action tokens until conversion into speech reaches completion.

* * * * *

UNITED STATES PATENT AND TRADEMARK OFFICE
CERTIFICATE OF CORRECTION

PATENT NO. : 5,640,590

DATED : June 17, 1997

INVENTOR : Willias J. Luther

It is certified that error appears in the above-identified patent and that said Letters Patent is hereby corrected as shown below:

FACE PAGE:

[56] References Cited

Insert the following:

```
--4,821,220    4/1989     Duisberg ............... 364/578
  5,261,097   11/1993     Saxon .................. 395/650
  5,473,744   12/1995     Allen et al. ........... 395/154
  5,440,677    8/1995     Case et al. ............ 395/154
  5,432,940    7/1995     Potts et al. ........... 395/700--
```

Signed and Sealed this

Seventeenth Day of February, 1998

Attest:

BRUCE LEHMAN

Attesting Officer  Commissioner of Patents and Trademarks